(12) United States Patent
Ben-Eliezer et al.

(10) Patent No.: US 8,953,058 B2
(45) Date of Patent: Feb. 10, 2015

(54) AXIAL CHROMATIC ABERRATION CORRECTION

(75) Inventors: Eyal Ben-Eliezer, Tel-Aviv (IL); Tomer Schwartz, Tel Aviv (IL); Ehpraim Goldenberg, Tel Aviv (IL); Noy Cohen, Tel Aviv (IL)

(73) Assignee: Fotonation Limited, Ballybrit, Galway (IE)

( * ) Notice: Subject to any disclaimer, the term of this patent is extended or adjusted under 35 U.S.C. 154(b) by 721 days.

(21) Appl. No.: 13/172,717

(22) Filed: Jun. 29, 2011

(65) Prior Publication Data

US 2013/0002908 A1   Jan. 3, 2013

(51) Int. Cl.
| H04N 5/228 | (2006.01) |
| H04N 5/232 | (2006.01) |
| H04N 5/217 | (2011.01) |
| H04N 9/64  | (2006.01) |
| H04N 3/14  | (2006.01) |
| H04N 9/04  | (2006.01) |

(52) U.S. Cl.
CPC .................................. H04N 9/045 (2013.01)
USPC ........ 348/222.1; 348/345; 348/241; 348/246; 348/272; 348/277

(58) Field of Classification Search
CPC ..................................................... H04N 9/045
USPC ....................................................... 348/222.1
See application file for complete search history.

(56) References Cited

U.S. PATENT DOCUMENTS

| 7,929,172    | B2 * | 4/2011 | Yamada et al.  | 358/1.15  |
| 7,973,850    | B2 * | 7/2011 | Ishiga         | 348/335   |
| 2008/0158377 | A1 * | 7/2008 | Chanas et al.  | 348/222.1 |

FOREIGN PATENT DOCUMENTS

EP   1 940 180 A1   7/2008

OTHER PUBLICATIONS

Extended Depth of Field (Edof) using sharpness transportation a cross colour channels christle-Loic,Hoang Phi Nguyen, Regis Tessieres, Marine Pyanet, Frederic, Guichard (published in 2008).*
European Patent Office, "European Search Report with Written Opinion" in application No. 12174079.9-2202, Applicant: Digital Optics Corporation Europe Limited, dated Sep. 20, 2012, 8 pages.
Current Claims in application No. 12174079.9-2202, dated Jun. 28, 2012.

(Continued)

*Primary Examiner* — Ahmed A Berhan
(74) *Attorney, Agent, or Firm* — Hickman Palermo Truong Becker Bingham Wong LLP

(57) ABSTRACT

A 9 pixel-by-9 pixel working window slides over an input Bayer image. For each such window, a demosaicing operation is performed. For each such window, corrective processing is performed relative to that window to produce relative differences for that window. For each such window for which relative differences have been produced, those relative differences are regulated. For each window, a maximum is found for that window's regulated relative differences; in one embodiment of the invention, this maximum is used to select which channel is sharp. For each window, the colors in that window are corrected based on the relative difference-based maximum found for that window. For each window, edge oversharpening is softened in order to avoid artifacts in the output image. The result is an output image in which axial chromatic aberrations have been corrected.

38 Claims, 5 Drawing Sheets

(56) References Cited

OTHER PUBLICATIONS

Guichard, Frederic et al., "Extended Depth-Of-Field Using Sharpness Transport", DxO Labs, 3 Rue Nationale, 92100 Boulogne, France, dated 2009, 12 pages.

European Patent Office, "Search Report" in application No. 12 174 079.9-1902, dated Aug. 7, 2014, 4 pages.
Claims in European Application No. 12 174 079.9-1902, dated Aug. 2014, 12 pages.

* cited by examiner

| R | G | R | G | R | G | R | G | R |
|---|---|---|---|---|---|---|---|---|
| G | B | G | B | G | B | G | B | G |
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |
| G | B | G | B | G | B | G | B | G |
| R | G | R | G | R | G | R | G | R |

AXIAL CHROMATIC ABERRATION CORRECTION

FIELD OF THE INVENTION

The present invention relates to the field of digital image processing, and in particular to imaging systems producing electronically derived images that have channel dependent color aberrations, such as longitudinal color artifacts or aberrations in captured images.

BACKGROUND

Imaging apparatus, such as photographic film cameras and electronic cameras, and in particular their optical assemblies, have inherent aberrations which can degrade the quality of images captured by such apparatus. One kind of aberration is a distortion, which refers to a change in the geometric representation of an object in the image plane. For instance, a rectangle might be reproduced with a pincushion or a barrel shape—hence the reference to pincushion distortion or barrel distortion. Another type of aberration, referred to as chromatic aberration, results from the fact that different wavelengths or colors of light are refracted by different amounts by an optical assembly. A further type of aberration is a field dependent aberration, where some characteristic, such as the brightness, of an image pixel is changed in the image plane in proportion to its position in the field, such as its distance from the center of the image.

Chromatic aberration appears when a lens is transmitting polychromatic light (many colors). Since the index of refraction of optical glass is wavelength dependent, the red, green and blue components bend differently at an optical interface in the lens. This leads to longitudinal (axial) and/or lateral chromatic aberration effects. When a lens fails to focus various colors sharply in the same plane, the lens is said to exhibit longitudinal (axial) chromatic aberration. In longitudinal chromatic aberration, the three components are brought to focus on different planes in the image space, which gives a color blurring effect. Thus, longitudinal chromatic aberration arises due to the focal length varying with wavelength (color). In lateral chromatic aberration, color components from a single point are brought to focus to different points on the same image plane, resulting in a lateral shift of the image. This has the effect of magnifying the three colors differently and can be visually seen as color fringing. Thus lateral chromatic aberration can be seen as an effect due to magnification varying with wavelength.

A great deal of the complexity of modern lenses is due to efforts on the part of optical designers to reduce optical aberrations. In certain cases, such as with single use film cameras or inexpensive digital cameras, it may be economically difficult to avoid usage of inexpensive optics. Unfortunately, as explained above, such optics possess inherent aberrations that degrade the quality of images formed by the optics. Consequently, it is desirable to compensate for these aberrations in the reproduction process (either in the capture device or in a host computer) so that final images free of aberrations may be obtained. In order to characterize these aberrations, the ability of a lens to transfer information from the object to an image plane is represented as a modulation transfer function (MTF). A lens MTF is a measure of how well the original frequency-dependent contrast of the object is transferred to the image.

In a typical camera, in addition to distortion and chromatic aberrations, the image formed at a focal plane (where the film or image sensor is located) can be blurred as a function of proximity to the optical axis of the optical assembly. For such field dependent aberrations, the further away from the optical axis (normally, the center of the image), the more the image is blurred. The resultant image therefore has an MTF that is a function of radial distance from the center of the image. The problem is exaggerated with images originating from inexpensive cameras, such as single use film cameras. Because of their simple optics or because the film may not be located in the position of best focus throughout the focal plane, single use film cameras tend to have significant sharpness loss with movement away from the optical axis toward the edges of the frame. Consequently, it is also desirable to compensate for these aberrations in the reproduction process (either in the capture device or in a host computer) so that final images free of field dependent aberrations may be obtained.

Some aberrations, specifically chromatic aberrations, are channel dependent aberrations in the sense that each color channel, e.g., red, green and blue channels, provides a different amount of the aberration artifact in the image plane. It has also been observed that some field dependent aberrations, such as position dependent blur, are also channel dependent. Consequently, a different amount of correction would ideally be provided for each color channel at the image plane. For instance, lens designers typically provide complicated, and therefore expensive, designs to differentially control the light rays according to wavelength in order to minimize such artifacts.

Especially if they are intended for consumer use, digital cameras, which are inherently more complex and expensive than simple film cameras, such as single use film cameras, must control cost in any way possible. The camera optics is a typical candidate for cost reduction, and channel-dependent artifacts thus become a concern. Despite such image quality concerns, it is usually desirable to provide a finished image file that is corrected for camera-related influences.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for correcting axial chromatic aberrations. A technique described herein is based on the assumption that at least one of the color channels (red, green, or blue) is sharp, or focused, with respect to the other potentially blurry color channels. Information in the focused channel is used to restore blurred information in the other channels. As a result, resolution and contrast in the output image are enhanced. Moreover, the depth of field also increases. Techniques described herein are applied directly to the Bayer image. Techniques described herein may be divided into two branches: one provides the actual correction, while the other regulates the amount of correction. Pixel correction is flexible and performed according to the nature of the information in a sliding working window which slides across the Bayer image. Selective correction is allowed for several cases. The "by default" correction is restoration according to the sharpest channel. However, the user can also switch to restoration according to the sharpest channel that also has the same sign as a current pixel of the sliding working window. The user also can switch to restoration according to the sharpest channel but with more caution when dealing with the red channel. The user can also switch to restoration using the blue channel only. In the case of an edge in a window, one may choose to work with a bigger window, so that edges are smoother. The technique is flexible enough to be adapted to low illumination situations in which greater care in restoration may be appropriate. The technique can be adapted to eliminate overshoot and undershoot in the case of edges. Two different regulation processes improve the manner in which the sharpest channel is chosen via maximal relative difference. Both corrections work on the relative differences. One restricts the amount of change as a function of the luminance "Y", and the other as a function of the maximum of the ratios between averages.

BRIEF DESCRIPTION OF THE DRAWINGS

In the drawings:

FIG. 2 is a block diagram that illustrates an example 9 pixel-by-9 pixel working window in a Bayer image.

FIG. 3A shows a set of weights that are used in the calculation of AvB when the central pixel is red or blue.

FIG. 3B shows a set of weights that are used in the calculation of AvB when the central pixel is green.

DETAILED DESCRIPTION

Figure 1A:
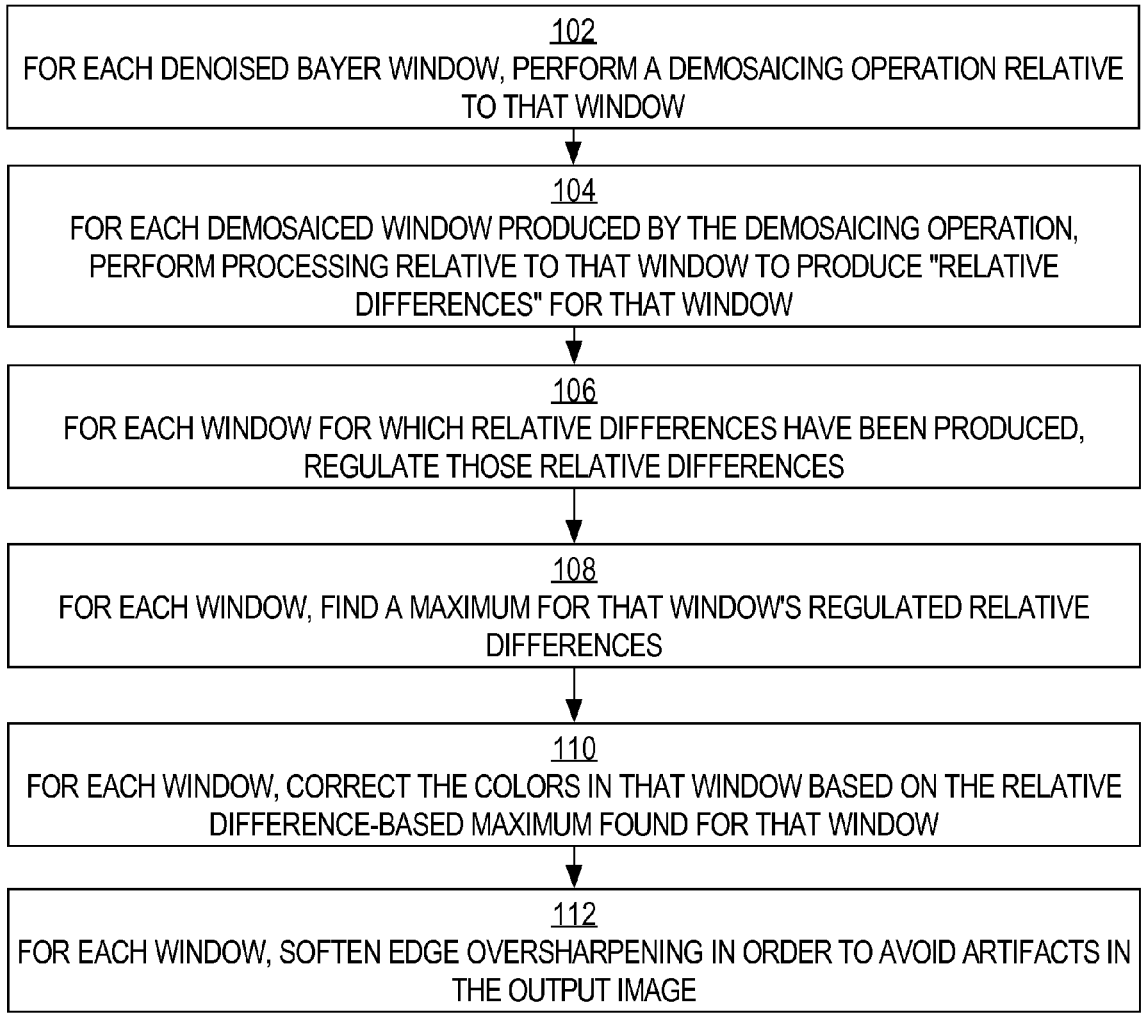
FIG. 1A is a flow diagram that illustrates a high-level overview of operations that are performed in order to correct axial chromatic aberrations in an image, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An embodiment of the invention corrects axial chromatic aberrations in a captured digital image by employing an axial chromatic aberration correction technique. The technique operates on the assumption that at least one of the color channels—red, green, or blue—is sharp, such that it is focused with respect to the other color channels. The technique uses information contained in the focused channel to restore blurred information in the other, unfocused channels. As a result, resolution and contrast are increased in the output image. The depth of field is also increased up to object distances under circumstances in which no one of the color channels is sharp.

According to an embodiment of the invention, the correction technique is applied directly to a Bayer image. A Bayer image is one in which, for any given pixel of the image, that pixel contains information for only one color channel. In a Bayer image, pixel rows alternate between "red-green" rows and "green-blue" rows. In a red-green row, pixels alternate between red pixels (pixels that contain only information for the red channel) and green pixels (pixels that contain only information for the green channel), such that the pattern of pixels on that row is red-green-red-green, etc. In a green-blue row, pixels alternate between green pixels (pixels that contain only information for the green channel) and blue pixels (pixels that contain only information for the blue channel), such that the pattern of pixels on that row is green-blue-green-blue, etc. Thus, viewed from one perspective, the Bayer image appears to be like a "mosaic." The process of generating, based on an input Bayer image, an output image in which each pixel contains intensity values for each of the red, green, and blue channels is therefore called "demosaicing."

In one embodiment of the invention, the correction technique is performed by an axial chromatic aberration correction module within a digital image capturing device such as a digital camera. In some such embodiments, this module optionally may be bypassed, such that a user of the device can elect to have the module's correction technique performed, or not, relative to the image as the user prefers, according to user input that the user supplied to the device. In one embodiment of the invention, the axial chromatic aberration correction module is positioned in between a denoising module, which performs denoising on the image prior to the passing of the denoised image to the correction module, and a sharpening module that restores and sharpens the corrected image that is output from the correction module.

FIG. 1A is a flow diagram that illustrates a high-level overview of operations that are performed in order to correct axial chromatic aberrations in an image, according to an embodiment of the invention. In one embodiment of the invention, a 9 pixel-by-9 pixel working window slides left-to-right, row-by-row, one pixel at a time over the input Bayer image. In block 102, for each such window, a demosaicing operation is performed relative to that denoised Bayer window. In block 104, for each such demosaiced window produced by the demosaicing operation, corrective processing is performed relative to that demosaiced window to produce "relative differences" for that window, which are discussed in greater detail below. In block 106, for each such window for which relative differences have been produced, those relative differences are "regulated;" the regulation of relative differences is also discussed in greater detail below. In block 108, for each window, a maximum is found for that window's regulated relative differences; in one embodiment of the invention, this maximum is used to select which channel is sharp. In block 110, for each window, the colors in that window are corrected based on the relative difference-based maximum found for that window. In block 112, for each window, edge oversharpening is softened in order to avoid artifacts in the output image. The result is an output image in which axial chromatic aberrations have been corrected.

Figure 1B:
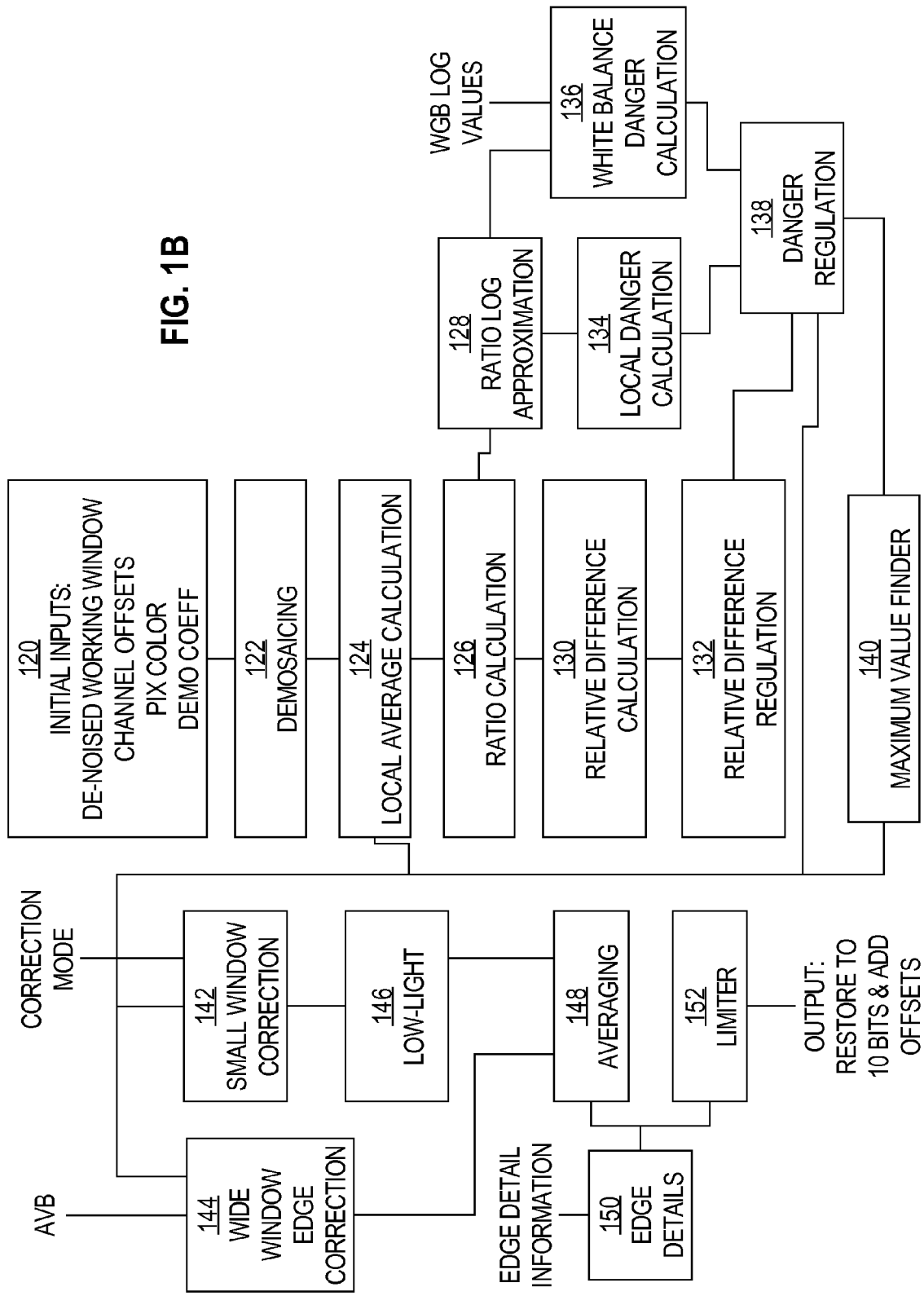
FIG. 1B is a block diagram that illustrates modules of an example system that performs the axial chromatic aberration correction techniques described herein.

FIG. 1B is a block diagram that illustrates modules of an example system that performs the axial chromatic aberration correction techniques described herein. Initial inputs 120 are received at a demosaicing module 122. Demosaicing module 122 passes demosaiced pixel values to a local average calculation module 124. Local average calculation module 124 outputs local averages to a ratio calculation module 126, a small window correction module 142, and a wide window correction module 144. Ratio calculation module 126 outputs ratios to both ratio log approximation module 128 and relative difference calculation module 130. Relative different calculation module 130 outputs a relative difference vector to relative difference regulator module 132. Ratio log approximation module 128 outputs ratio logs to both local danger calculation module 134 and white balance danger calculation module 136. White balance danger calculation module 136 receives both ratio logs and white balance gain logarithmic values. Both local danger calculation module 134 and white balance danger calculation module output danger values to danger regulation module 138. Relative difference regulator module 136 also outputs regulated relative difference vectors to danger regulation module 138 and small window correction module 142. Danger regulation module 138 outputs regulated relative difference vectors to maximum value finder module 140, small window correction module 142, and wide window correction module 144. Maximum value finder module 140 outputs maximum values to small window correction module 142 and wide window correction module 144. Small window correction module 142 receives a correction mode indication as well as other input indicated above and outputs revised pixel correction values to low-light module 146. Low-light module 146 outputs revised pixel correction values to an averaging module 148. Wide window correction module 144 receives weighted average values (AvB) and outputs revised pixel correction values to averaging module 148. Edge details module 150 receives edge details and provides output to averaging module 148 and limiter module 152. Averaging module 148 outputs averaged pixel correction values to limiter 152. Limiter 152 limits oversharpening by pixel correction values and outputs limited pixel correction values 154, which may be applied to the output image.

Demosaicing within the Current Working Window

As is discussed above, for each 9 pixel-by-9 pixel working window in the Bayer image, a demosaicing operation is performed. FIG. 2 is a block diagram that illustrates an example 9 pixel-by-9 pixel working window in a Bayer image. In the example window illustrated, the central pixel (i.e., the pixel located at the $5^{th}$ row and $5^{th}$ column of the window) happens to be a red pixel (meaning that the pixel contains intensity information for the red channel but not the blue or green channels). However, depending on the position of the particular working window within the input Bayer image, the central pixel could alternatively be a blue pixel (meaning that the pixel contains intensity information for the blue channel but not the red or green channels) or a green pixel (meaning that the pixel contains intensity information for the green channel but not the blue or red channels). Under circumstances in which the central pixel is a green pixel, the green pixel may be, more specifically, a green pixel in a red-green row, or a green pixel in a green-blue row. In the following discussion, a red pixel is referred to as an R pixel, a blue pixel is referred to as a B pixel, a green pixel in a red-green row is referred to as a GR pixel, and a green pixel in a green-blue row is referred to as a GB pixel. In the discussion below, a pixel's "channel type" refers to whether the pixel is an R pixel, a B pixel, a GR pixel, or a GB pixel.

According to an embodiment of the invention, in a particular working window, the demosaicing operation is performed only relative to the central pixel and eight other pixels that are both (a) contained within a subwindow that is centered on the central pixel and (b) of the same channel type as the central pixel in that subwindow; demosaicing for other pixels within the particular working window may be performed during the processing of other working windows. In the example 9 pixel-by-9 pixel working window illustrated in FIG. 2, since the channel type of the central pixel is R, the demosaicing operation for that working window will be performed on all of (and, for this particular working window, only) the pixels within the central subwindow that share the R channel type. In the example working window shown in FIG. 2, these pixels are the pixels in each of the corners of the subwindow, the pixels at the centers of each edge of the subwindow, and the central pixel itself. The color-indicating letters within these pixels are circled in FIG. 2.

According to an embodiment of the invention, later steps in the overall correction technique use all three spectral, or component, values (i.e., red, green, and blue) for each pixel. However, as is discussed above, because the input image is a Bayer image, each pixel in the Bayer image contains information for only one such spectral value. Consequently, the demosaicing operation is performed in order to generate, for each of the pixels on which the operation is performed, the other two spectral, or component, values that are not expressly indicated for that pixel. The unexpressed spectral values can be calculated based on values of neighboring pixels. The calculation of the unexpressed spectral values may be linear and may use convolution kernels.

Under circumstances such as are assumed to be present in the example working window of FIG. 2, the red spectral values for the nine pixels upon which the demosaicing operation is to be performed are already expressed, since the channel type of those pixels is R. Therefore, the green and blue spectral values for these nine pixels are calculated through the demosaicing operation. Under alternative circumstances in which the blue spectral values for the nine pixels are already expressed, the red and green spectral values for those nine pixels are calculated through the demosaicing operation. Under yet other alternative circumstances in which the green spectral values for the nine pixels are already expressed, the red and blue spectral values for those nine pixels are calculated through the demosaicing operation.

In the following discussion, the nine pixels within the subwindow upon which the demosaicing operation is to be performed are considered to correspond to three separate 3-by-3 matrices—one such matrix for each spectral component (red, green, and blue). The red matrix, labeled with the identifier $Ca_R$, contains the red spectral values for the nine pixels. The green matrix, labeled with the identifier $Ca_G$, contains the green spectral values for the nine pixels. The blue matrix, labeled with the identifier $Ca_B$, contains the blue spectral values for the nine pixels. The demosaicing operation essentially calculates all of the unexpressed values in each of these matrices.

Thus, $Ca_R(1,1)$, $Ca_G(1,1)$, and $Ca_B(1,1)$ are to reflect the red, green, and blue spectral values, respectively, of the top left corner pixel of the subwindow. $Ca_R(1,2)$, $Ca_G(1,2)$, and $Ca_B(1,2)$ are to reflect the red, green, and blue spectral values, respectively, of the central pixel of the top row of the subwindow. $Ca_R(1,3)$, $Ca_G(1,3)$, and $Ca_B(1,3)$ are to reflect the red, green, and blue spectral values, respectively, of the top right corner pixel of the subwindow. $Ca_R(2,1)$, $Ca_G(2,1)$, and $Ca_B(2,1)$ are to reflect the red, green, and blue spectral values, respectively, of the central pixel of the leftmost column of the subwindow. $Ca_R(2,2)$, $Ca_G(2,2)$, and $Ca_B(2,2)$ are to reflect the red, green, and blue spectral values, respectively, of the central pixel of the subwindow. $Ca_R(2,3)$, $Ca_G(2,3)$, and $Ca_B(2,3)$ are to reflect the red, green, and blue spectral values, respectively, of the central pixel of the rightmost column of the subwindow. $Ca_R(3,1)$, $Ca_G(3,1)$, and $Ca_B(3,1)$ are to reflect the red, green, and blue spectral values, respectively, of the bottom left corner pixel of the subwindow. $Ca_R(3,2)$, $Ca_G(3,2)$, and $Ca_B(3,2)$ are to reflect the red, green, and blue spectral values, respectively, of the central pixel of the bottom row of the subwindow. $Ca_R(3,3)$, $Ca_G(3,3)$, and $Ca_B(3,3)$ are to reflect the red, green, and blue spectral values, respectively, of the bottom right corner pixel of the subwindow.

Restoration Operations Generally

In one embodiment of the invention, after demosaicing has been performed, restoration operations are performed. The restoration operations involve a calculation of relative differences, regulation of relative differences, regulations on "danger," the finding of a maximum on relative differences, small window corrections, low illumination mode operations, wide window edge correction, including wide window average calculation, edge and detail operations, limiting, offset compensation, and clipping.

Relative Difference Calculation

According to an embodiment of the invention, relative differences are calculated for each working window. The relative difference is a quantity that measures the sharpness of each color channel. In one embodiment of the invention, the relative difference is calculated by (a) determining, for each 3-by-3 spectral matrix ($Ca_R$, $Ca_G$, and $Ca_B$) the average value of the central pixel's eight neighbors (i.e., the other eight pixels in the same subwindow that share the central pixel's channel type), (b) determining, for each component (red, green, and blue) the difference between the central pixel's value and the calculated average for the neighbor pixels, and (c) dividing the difference by the calculated average. Dividing the difference by the average makes comparison between relative difference values possible.

More specifically, in one embodiment of the invention, for a particular 3-by-3 spectral matrix, three averages are calculated: mr (for the red component), mg (for the green component), and mb (for the blue component) using the following equations:

$$mr = \text{round}\{[Ca_R(1,1)+Ca_R(1,2)+Ca_R(1,3)+Ca_R(2,1)+Ca_R(2,3)+Ca_R(3,1)+Ca_R(3,2)+Ca_R(3,3)]/8\}$$

$$mg = \text{round}\{[Ca_G(1,1)+Ca_G(1,2)+Ca_G(1,3)+Ca_G(2,1)+Ca_G(2,3)+Ca_G(3,1)+Ca_G(3,2)+Ca_G(3,3)]/8\}$$

$$mb = \text{round}\{[Ca_B(1,1)+Ca_B(1,2)+Ca_B(1,3)+Ca_B(2,1)+Ca_B(2,3)+Ca_B(3,1)+Ca_B(3,2)+Ca_B(3,3)]/8\}$$

Next, according to an embodiment of the invention, differences (dr for red, dg for green, and db for blue) between each of the above averages (mr, mg, and mb) and the corresponding central pixel values are calculated using the following equations:

$$dr = mr - Ca_R(2,2)$$

$$dg = mg - Ca_G(2,2)$$

$$db = mb - Ca_B(2,2)$$

Next, according to an embodiment of the invention, ratios of averages (mr, mb, and mg) are calculated. In the case of a central red pixel, the averages are mr/mb and mr/mg. In the case of a central blue pixel, the averages are mb/mr and mb/mg. In the case of a central green pixel, the averages are mg/mr and mg/mb.

Next, according to an embodiment of the invention, relative differences are calculated. It should be noted that the relative differences for the three spectral components are stored in a vector RD containing three elements (one for each spectral component), where the element corresponding to the central pixel's color component is positioned as the first element in the vector. Additionally, a current color average mc may be calculated.

In the case of a central red pixel, the relative difference vector RD and color average mc is calculated using the formula (where dr is the first element of vector RD):

$$RD = \text{fix}\left\{\left[dr \quad \frac{mr}{mb}db \quad \frac{mr}{mg}dg\right]/2\right\}; mc = \text{floor}\left(\frac{mr}{2}\right)$$

In the case of a central blue pixel, the relative difference vector RD and color average mc is calculated using the formula (where db is the first element of vector RD):

$$RD = \text{fix}\left\{\left[db \quad \frac{mb}{mr}dr \quad \frac{mb}{mg}dg\right]/2\right\}; mc = \text{floor}\left(\frac{mb}{2}\right)$$

In the case of a central green pixel, the relative difference RD and color average mc is calculated using the formula (where dg is the first element of vector RD):

$$RD = \text{fix}\left\{\left[dg \quad \frac{mg}{mr}dr \quad \frac{mg}{mb}db\right]/2\right\}; mc = \text{floor}\left(\frac{mg}{2}\right)$$

Regulation of Relative Differences

Artifacts may occur when a chosen RD element for correction has a much higher value, and sometimes opposite sign, with respect to the first RD element (i.e., the current color). Therefore, in one embodiment of the invention, RD elements are regulated. Two sets of parameters may be considered for regulation: (a) parameters for regulation in case of same-sign RDs, and (b) parameters for regulation in case of opposite-sign RDs. In both cases, regulation may be performed with a linear limiting function. The input for this function is the luminance, as well as low_limit and high_limit values in pixel resolution. The output value is in pixel resolution. For example, the limit function might be as follows:

$$Y = \text{floor}\left(\frac{\text{floor}\left(\frac{caR(2,2)}{4}\right) + \text{floor}\left(\frac{caG(2,2)}{2}\right) + \text{floor}\left(\frac{caB(2,2)}{4}\right)}{2^{PixRes-8}}\right) @ 8 \text{ bits}$$

if $Y > Y_{thr}$;

$$\text{Limit}(Y) = \text{LowLimit} + \text{round}\left(\frac{Y*(\text{HighLimit}-\text{LowLimit})}{2^8}\right)$$

else;

$$\text{Limit}(Y) = \text{Limit}(Y_{thr}) + \text{round}\left(\frac{a*(\text{Limit}(Y)-\text{Limit}(Y_{thr}))}{2^6}\right)$$

In the foregoing equation, LowLimit is equal to max_change_low/max_change_low_s, where max_change_low and max_change_low_s are specified minimum change values for RD regulation. In the foregoing equation, HighLimit is equal to max_change_high/max_change_high_s, where max_change_high and max_change_high_s are specified maximum change values for RD regulation. In the foregoing equation, "a" is equal to coeff_ll/coeff s_ll, where coeff_ll and coeff_s_ll are specified slopes for RD regulation in low-light conditions. In the foregoing equation, Y is equal to graph_1to2_thr/graph_1to2_s_thr, where graph_1to2_thr and graph_1to2_s_thr are specified thresholds for RD regulation in low-light conditions. Values of these parameters may vary from sensor to sensor.

According to one embodiment of the invention, RD regulation is performed via the following technique. First, a difference between (a) vector RD and (b) another three-element vector whose elements are all equal to the first element of vector RD is calculated. This difference is a vector called difVecSnorm. Thus, difVecSnorm is calculated according to the equation: difVecSnorm=RD−[RD(1), RD(1), RD(1)].

Next, a limit output of the regulation function Limit(Y), described above, is calculated. The result of this calculation is called normLim. In one embodiment of the invention, a first set of values is selected for use as parameters to the regulation function when the chosen RD element for correction has the same sign as the first element in the RD vector, and a second set of values, different from the first set of values, is selected for use as parameters to the regulation function when the chosen RD element for correction has the opposite sign as the first element in the RD vector.

Next, indices of difVecSnorm, which have absolute values higher than normLim, are identified. These indices are called $I_k$.

Next, a value for a parameter fsupp is calculated based on difVecSnorm, $I_k$, normLim, and a specified parameter called suppSlope. In one embodiment, suppSlope indicates the power of support for RD regulation, is equal to 8 if RD is 9 bits, and is equal to 16 if RD is 10 bits. According to one embodiment, the formula for calculating fsupp is:

$$fsupp = \begin{cases} abs(difVecSNorm) & \text{if index} \in I_k \ \&abs(difVecSNorm) < normLim + suppSlope \\ suppSlope & \text{if index} \in I_k \ \&abs(difVecSNorm) \geq normLim + suppSlope \\ 0 & \text{otherwise} \end{cases}$$

Finally, RD elements are recalculated with the $I_k$ indices using the following equation:

$$RD'(I_k) = RD(I_k) + \text{round}\left((RD(1) - RD(I_k)) * \frac{fsupp}{suppSlope}\right)$$

Essentially, the foregoing RD regulation technique determines whether the absolute value of the difference between (a) the first element of the RD vector, RD(1) (corresponding to the color of the central pixel of the working window) and (b) another element (e.g., RD(2) or RD(3)) of the RD vector is higher than a specified level. If the difference is higher than the specified level, then the regulation technique reduces that other RD element toward the first element RD(1) lineally. RD' is an output vector containing the regulated elements.

Regulations on Danger

As is discussed above, in one embodiment of the invention, regulation is performed directly on the RD vector in order to avoid spiky changes. In one embodiment of the invention, regulation is additionally or alternatively performed based on a ratio of the average of the working window's central pixel color and each of the other color's averages. This latter kind of regulation is called "danger" regulation. According to the determined amount of "danger," the elements of the RD vector may be regulated further before the maximum is selected. An alternative embodiment, using a different technique for calculating danger, is discussed further below.

According to one embodiment, the danger regulation technique uses, among other input, two ratios: Ratio1 and Ratio2. The ratios that are used as input depend upon the channel of the working window's central pixel. The ratios involve the averages mr, mb, and mg, the calculation of each of which is discussed above. If the central pixel is red, then Ratio1 is equal to mr/mb and Ratio2 is equal to mr/mg. If the central pixel is blue, then Ratio1 is equal to mb/mr and Ratio2 is equal to mb/mg. If the central pixel is green, then Ratio1 is equal to mg/mr and Ratio2 is equal to mg/mb.

According to one embodiment, the danger regulation technique also uses, among other input, three logarithm values of white balance gains. These logarithm values include white balance gains for red (Wr), blue (Wb), and green (Wg) components. Three input parameters W1, W2, and W3 are set based on the color of the central pixel. In one embodiment, W1=Wr, W2=Wb, and W3=Wg.

According to one embodiment, the danger regulation technique also uses, among other input, parameters called danger_high_thr (specifying a maximum change value for white balance danger regulation), danger_low_thr (specifying a minimum change value for white balance danger regulation), dangerL_high_thr (specifying a maximum change value for danger regulation), and dangerL_low_thr (specifying a minimum change value for danger regulation). Values of these parameters may vary from sensor to sensor. According to one embodiment, the danger regulation technique begins by reducing the Ratio1 and Ratio2 resolutions. The resulting lower-resolution ratios are called danger1 and danger2.

Next, the danger regulation technique approximates log2(danger1) and log2(danger2).

In one embodiment, this approximation is performed by through the following computations:

Log_two_*N*(1)=floor(log 2(danger1));

Log_two_*N*(2)=floor(log 2(danger2));

*b*01=((abs(danger1−2^Log_two_*N*(1))>0));

*b*02=((abs(danger2−2^Log_two_*N*(2))>0));

Log_two_*D*(1)=round((16/2^Log_two_*N*(1))*(danger1−2^Log_two_*N*(1))+16*Log_two_*N*(1))+*b*01;

Log_two_*D*(2)=round((16/2^Log_two_*N*(2))*(danger2−2^Log_two_*N*(2))+16*Log_two_*N*(2))+*b*02;

Log_two_*D*(Log_two_*D*>128)=128;

Next, in one embodiment of the invention, the danger regulation technique checks for white balance danger. In one embodiment of the invention, the determination is performed through the following computations, in which the parameter dg_res specifies the power of danger resolution, and in one embodiment equals 5, and in which the parameter GlobalWB_flag equals either 1 or 0 depending on whether the user does or does not want to use global white balance gain:

danger*WB*=round((abs(Log_two_*D*(1)+*W*1−*W*2−96)+abs(Log_two_*D*(2)+*W*1−*W*3−96))/2);

danger*WB*(danger*WB*>=2^*dg*_*res*)=2^*dg*_*res*;

*dgWB*=danger_low_*thr*+round(danger*WB**(danger_high_*thr*−danger_low_*thr*)/2^*dg*_*res*);

*dgWB*(*dgWB*<0)=0;

*dgWB*(*dgWB*>=2^*dg*_*res*)=2^*dg*_*res*;

*dgWB*=*dgWB**Global*WB*_flag+(~Global*WB*_flag)*2^*dg*_*res*;

Next, in one embodiment of the invention, the danger regulation technique checks for local danger by performing the following computations:

Log_two_*D*(Log_two_*D*<64)=64;

Log_two_*D*=*abs*(Log_two_*D*−96);

$$dgLWB2 = dangerL\_low\_thr + \text{round}(\text{Log\_two\_}D(1) * (dangerL\_high\_thr - dangerL\_low\_thr)/2\,\hat{}\,5);$$

$$dgLWB2(dgLWB2<0)=0;$$

$$dgLWB2(dgLWB2>=2\,\hat{}\,dg\_res)=2\,\hat{}\,dg\_res;$$

$$dgLWB3 = dangerL\_low\_thr + \text{round}(\text{Log\_two\_}D(2) * (dangerL\_high\_thr - dangerL\_low\_thr)/2\,\hat{}\,5);$$

$$dgLWB3(dgLWB3<0)=0;$$

$$dgLWB3(dgLWB3>=2\,\hat{}\,dg\_res)=2\,\hat{}\,dg\_res;$$

Next, in one embodiment of the invention, the danger regulation technique corrects elements in the RD vector with respect to the computed danger. In one embodiment of the invention, this correction is made by modifying elements of difVecS, which is discussed above.

For example, the second RD element may be danger-corrected via the following computations:

$$\text{danger\_axis2} = \text{round}(dgWB * dgLWB2/2\,\hat{}\,dg\_res);$$

$$\text{dif\_vecS}(2) = \text{dif\_vecS}(2) + \text{round}((\text{dif\_vecS}(1) - \text{dif\_vecS}(2)) * \text{danger\_axis2}/2\,\hat{}\,dg\_res);$$

For another example, the third RD element may be danger-corrected via the following computations:

$$\text{danger\_axis3} = \text{round}(dgWB * dgLWB3/2\,\hat{}\,dg\_res);$$

$$\text{dif\_vecS}(3) = \text{dif\_vecS}(3) + \text{round}((\text{dif\_vecS}(1) - \text{dif\_vecS}(3)) * \text{danger\_axis3}/2\,\hat{}\,dg\_res);$$

Improved Robustness in Axial Chromatic Aberration Correction for Abrupt Changes in Hue Using Alternative Danger Measure

As is mentioned above, an alternative technique is also discussed herein for computing and using danger. The technique discussed above for calculating danger may, under some circumstances, provide artifacts in case of an edge that represents an abrupt change in hue. This is because the danger calculation technique discussed above is point-wise, being carried out on the first moments (averages), which are constants in the working window. The alternative danger calculation technique described below uses higher moments, such as, for example, standard deviations or other measures that measure amplitudes of change in the working window. Techniques described below adopt a different definition of danger than the techniques above, thereby taking an amount of change in hue into consideration.

The 3-by-3 spectral matrices $Ca_R$, $Ca_B$, and $Ca_G$ are defined above in the section titled "DEMOSAICING WITHIN THE CURRENT WORKING WINDOW." The (i,j) element of the $Ca_R$ matrix for each (i,j) is denoted $R_{ij}$. The (i,j) element of the $Ca_B$ matrix for each (i,j) is denoted $B_{ij}$. The (i,j) element of the $Ca_G$ matrix for each (i,j) is denoted $G_{ij}$. Based on these elements from these three spectral matrices, another three 3-by-3 matrices, $C_{rg}$, $C_{rb}$, and $C_{gb}$, each representing ratios between corresponding pixels in various pairs of the spectral matrices, are calculated as follows:

$$C_{rg}(i,j) = \frac{R_{ij}}{G_{ij}}$$

$$C_{rb}(i,j) = \frac{R_{ij}}{B_{ij}}$$

$$C_{gb}(i,j) = \frac{G_{ij}}{B_{ij}}$$

These matrices are called "chroma" matrices. In case of an abrupt hue change in the working window, a significant gradient will likely be found in at least one of these chroma matrices. In one embodiment of the invention, gradients are applied to the chroma matrices in the x and y directions. To apply gradients, Sobel matrices may be used, although other technique also may be employed to apply gradients. The Sobel operator is well known. In the following equations, $Y_{rg}$ and $X_{rg}$ represent the Sobel gradient of $C_{rg}$ in the y and x directions, respectively; $Y_{rb}$ and $X_{rb}$ represent the Sobel gradient of $C_{rb}$ in the y and x directions, respectively; and $Y_{gb}$ and $X_{gb}$ represent the Sobel gradient of $C_{gb}$ in the y and x directions, respectively:

$$Y_{rg} = \text{abs}\{\text{Sobel}_y(C_{rg})\}$$

$$X_{rg} = \text{abs}\{\text{Sobel}_x(C_{rg})\}$$

$$Y_{rb} = \text{abs}\{\text{Sobel}_y(C_{rb})\}$$

$$X_{rb} = \text{abs}\{\text{Sobel}_x(C_{rb})\}$$

$$Y_{bg} = \text{abs}\{\text{Sobel}_y(C_{gb})\}$$

$$X_{bg} = \text{abs}\{\text{Sobel}_x(C_{gb})\}$$

The above six Sobel gradient values represent the hue change in each direction of the current working window. A maximal hue change within the current working window is then computed using the following formula, although, in alternative embodiments, other techniques for calculating the maximum may be used instead:

$$C = \max\left\{\frac{Y_{gb} + X_{gb}}{2}, \frac{Y_{rb} + X_{rb}}{2}, \frac{Y_{rg} + X_{rg}}{2}\right\}$$

Three ratios of spectral averages, mr/mg, mr/mb, and mg/mb, are discussed above in the section titled "RELATIVE DIFFERENCE CALCULATION." In an embodiment of the invention, a maximum of these ratios is also calculated, using the formula:

$$\langle C \rangle = \max\left\{\frac{mr}{mg}, \frac{mr}{mb}, \frac{mg}{mb}\right\}$$

In order to avoid excessive division operations, the foregoing matrices and values may be computed using the absolute value of the Log 2 approximation rather than division. Avoiding division operations may beneficially reduce gate counts in circuitry.

In one embodiment of the invention, the alternative danger parameter is calculated based on the maximum hue change, C, and the maximum ratio of averages, <C>:

$$\text{danger} = \frac{\langle C \rangle + C}{2}$$

If this danger value is excessively large—for example, if the danger value exceeds a specified threshold—then this means that either the averages are significantly different, or that a hue change occurs within the current working window. In either case, extra care is appropriate during the performance of pixel correction. In one embodiment of the invention, danger regulation is conducted upon the RD vector's elements as described above, substituting the above alternative danger value in place of danger1 and danger2 in the previous description.

Furthermore, according to one embodiment of the invention, chromatic aberration correction is not performed in areas of an image that exhibit intensity saturation. In such an embodiment, if the maximal value in the current working window, Max, is higher than a specified value, $L_0$, then the output pixel value, Out, is determined using the following expression, in which $\alpha=\text{Max}-L_0$ and $\beta=1023-\text{Max}$:

$$Out = \frac{(OriginalPixel)(\alpha) + (CAcorrectedPixel)(\beta)}{1023 - L_0}$$

Finding the Maximum in the RD Vector (Finding the Sharpest Color)

According to one embodiment of the invention, after the RD vector's elements have been regulated as discussed above, the maximal value of the RD vector is found. The channel (red, green, or blue) that provides the maximal value is considered to be the sharpest channel.

According to an embodiment of the invention, after the sharpest channel has been found for the working window, using the techniques described above, the axial chromatic aberration correction module computes multiple possible correction values, each corresponding to a different correction mode, for the central pixel of the working window. Any of these corrections may be applied to the central pixel. In one embodiment of the invention, the user of the image-capturing device (e.g., digital camera) selects which one of the correction modes is applicable, and the correction module applies the computed correction value to the central pixel according to the user-selected correction mode. In one embodiment of the invention, the selected correction value is assigned to a variable called CA_pix, which is referred to below.

In the discussion below, the parameter "orig" is the central pixel of the current (expressed) color. Thus, if the central pixel of the working window prior to demosaicing was a red pixel (because it only expressed a value for the red channel), then orig equals $Ca_R(2,2)$. Alternatively, if the central pixel of the working window prior to demosaicing was a green pixel (because it only expressed a value for the green channel), then orig equals $Ca_G(2,2)$. Alternatively, if the central pixel of the working window prior to demosaicing was a blue pixel (because it only expressed a value for the blue channel), then orig equals $Ca_B(2,2)$. The parameter mc is calculated as described above, and represents the average of the current color.

According to one embodiment, the correction module performs the following computations in order to calculate a correction value for a first correction mode. First, the correction module calculates the element values of a vector pix_vec (the previously regulated elements of RD' are, in one embodiment, stored in the variable dif_vecS):

pix_vec=mc−dif_vecS

Next, the correction module calculates the correction value that corresponds to the first correction mode; in this mode, the central pixel is corrected based on the sharpest channel having the same sign as the expressed channel of the central pixel, as determined using the techniques described above. If the value of orig is greater than the value of mc, then the correction value for the central pixel is set to the maximum value of the elements in the pix_vec vector. Alternatively, if the value of orig is less than the value of mc, then the correction value for the central pixel is set to the minimum value of the elements in the pix_vec vector. In any other case, the default correction for the central pixel is set to the value of the first element of pix_vec (i.e., pix_vec(1)).

In one embodiment of the invention, for a second correction mode, the correction module computes a second correction value that is the most distant from the average. This second correction value is set equal to pix_vec(ind), where abs(dif_vecS[ind])=max(abs(dif_vecS)).

In one embodiment of the invention, for a third correction mode, the correction module computes a third correction value. In the third correction mode, more care is taken relative to the red channel. In computing the third correction value, first, the correction module determines the sign of the sharpest channel, by computing SDR0=sign(RD(ind)), where abs(dif_vecS[ind])=max(abs(dif_vecS)). Next, the correction module determines whether the first element of dif_vecS is smaller than the third element of dif_vecS, by computing T2O_check=abs(dif_vecS(3))>abs(dif_vecS(1)). If the original sign of the sharpest channel is the same as the sign of the current color, or if the sharpest channel is not the red channel, then the third correction value is set to be the same as in the second mode; thus, the second mode, discussed above, is the default mode if the sharpest channel is not red. The second mode is also allowed if the orientation above or below the window average is maintained. If the sharpest channel is the red channel and orientation about the local average is not maintained, then greater care is taken. The orientation change is not necessarily to be believed in such a case, since a lens may provide a low modulation transfer function (MTF) value for the red channel, making it more sensitive to noise. Since correction is still desirable, under these circumstances, the next sharpest channel (green or blue) is checked based on the value of T2O_check, discussed above. If T2O_check is true, then the third correction value is taken from the third element in the pix_vec vector. If T2O_check is false, then no correction is made for the third correction mode. In one embodiment, the correction value for the third mode is calculated using the following computations:

```
if (SDR0==sign(RD(1)) || ind~=2), 3rd_mode_value=2nd_mode_value;
    else
        if T2O_check,
            3rd_mode_value=pix_vec(3);
        else 3rd_mode_value=pix_vec(1);
        end;
    end;
```

In one embodiment of the invention, for a fourth correction mode, the correction module computes a fourth correction value. In the fourth correction mode, also called the "macromode," correction is always made according to the blue channel. The correction module sets the value of MacroModeInd based on the location of the blue element within the RD vector; this location depends on the color channel of the central pixel. If the central pixel is red, then MacroModeInd is set to 2. If the central pixel is green, then MacroModeInd is set to 3. If the central pixel is blue, then MacroModeInd is set to 1. The fourth correction value may be determined using the following computations:

4th_correction_value=pix_vec(:,: 1)*(MacroModeInd==1)+pix_vec(:,: 2)*(MacroModeInd==2)+pix_vec(:,: 3).*(MacroModeInd==3);

Low Illumination Mode

Extra care often should be taken in case of low illumination areas, since they are sensitive to noise. According to one embodiment of the invention, the correction module can be forced to maintain sign and even not to correct at all. First, the correction module determines whether the low illumination mode is required and whether there is a low-light condition. For example, the correction module may make this determination by performing the following computation:

$$testY=(Low\_illum\_mode>0)*(Y\_current<Low\_Y\_val\_thr);$$

If the conditions are satisfied, then the correction module calculates the luminance difference and clips. If the conditions are not satisfied, then the correction module resets Y_diff to zero. For example, the correction module may perform this operation by performing the following computations:

$$Y\_diff=(Low\_Y\_val\_thr-Y\_current)*testY;$$

$$Y\_diff(Y\_diff>2\hat{}Low\_Y\_val\_res)=2\hat{}Low\_Y\_val\_res;$$

The correction module can then choose how to average according to the value of Low_illum_mode. If Low_illum_mode equals 0, then the averaging for low illumination may be bypassed. If Low_illum_mode equals 1, then the averaging for low illumination may be based on the second correction value for the second correction mode. If Low_illum_mode equals 2, then the averaging for low illumination may be based on the value of orig, which is discussed above. The following computations may be performed to cause this, in which the value of variable CA_pix equals the correction value for the selected mode:

$$softerPix=1st\_mode\_correction\_value*(Low\_illum\_mode==1)+orig*(Low\_illum\_mode>1)+CA\_pix*(Low\_illum\_mode==0);$$

$$CA\_pix=CA\_pix+round(Y\_diff*(softerPix-CA\_pix)/2\hat{}Low\_Y\_val\_res);$$

The correction value to be used in low illumination mode is then found in the value of CA_pix.

Wide Window Edge Correction

The wide window edge correction technique calculates axial chromatic aberration correction in a manner that fits edge features. The following conditions are assumed to be true for edge cases: there is only one edge in the whole working window, maximal and minimal values of an edge are not affected by MTF, and the direction of correction is assumed to be governed by the current color (i.e., no sign problems). In one embodiment, under these assumptions, the correction module performs wide window edge correction as follows.

Figures 3A, 3B:
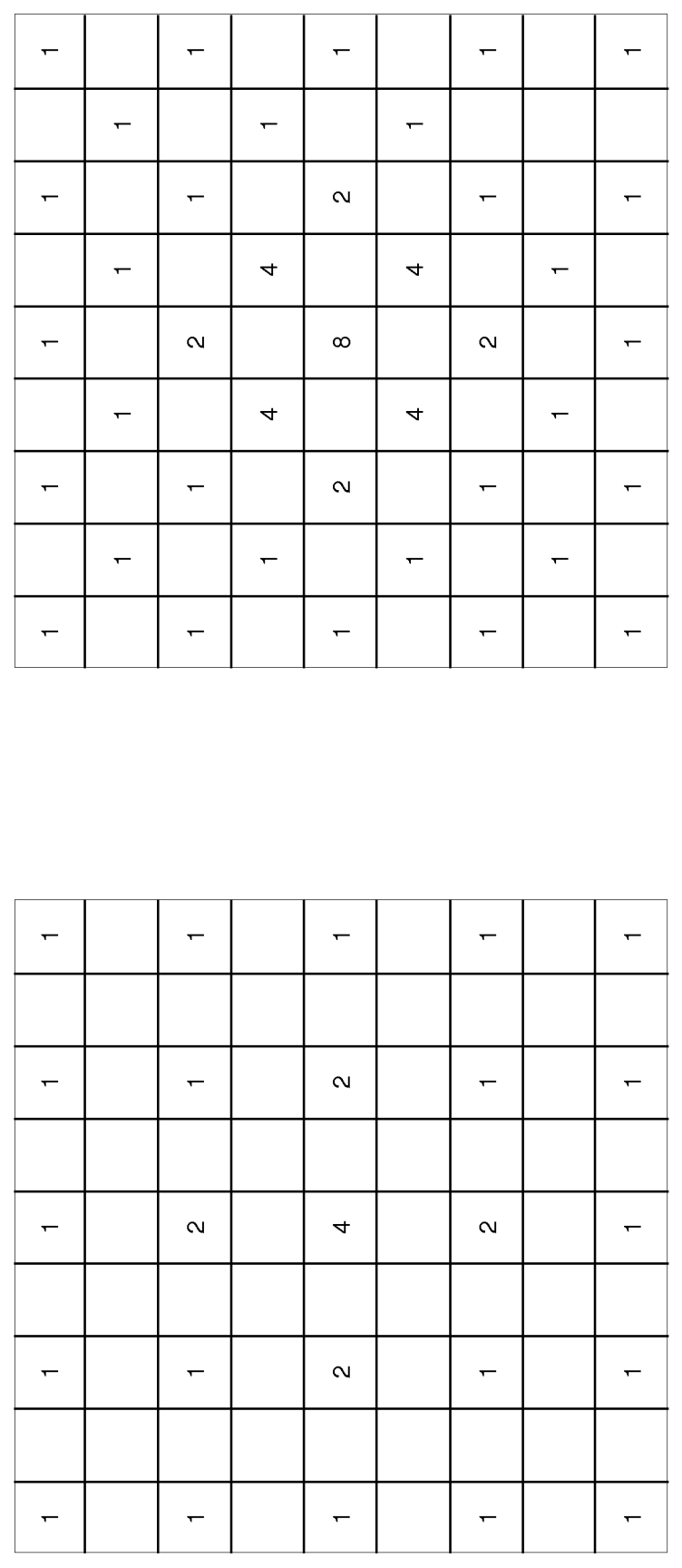

First, the wide window average, called AvB, is received as input. AvB is calculated based on a selected one of two sets of weights that are applied to certain pixels in the 9 pixel-by-9 pixel working window, depending on the color of the central pixel. The values of the weighted pixels are multiplied by the weights thereof, and then the weighted values are averaged. FIG. 3A shows a set of weights that are used in the calculation of AvB when the central pixel is red or blue. FIG. 3B shows a set of weights that are used in the calculation of AvB when the central pixel is green. If the central pixel is red or blue, then the result is shifted by 32. If the central pixel is green, then the result is shifted by 64. The calculation of AvB may be performed during demosaicing or by a chroma-denoise module.

An offset reduction is then performed. The average, AvB, is reduced down to 9 bits. If the central pixel is red, then $AvB=AvB+r_{offset}$. If the central pixel is green, then $AvB=AvB+g_{offset}$. If the central pixel is blue, then $AvB=AvB+b_{offset}$. The following computations are then performed relative to AvB:

$$AvB=AvB*(AvB>0);$$

$$AvB=floor(AvB/2);$$

The correction module then performs wide window edge correction based on AvB, as long as macro mode (the fourth correction mode) is not selected. For example, the wide window edge correction may be performed using the following computation, where CA_pix_Ed indicates the value of the correction to be made to the central pixel.

$$CA\_pix\_Ed=(max(pix\_vec,[\ ],3)*(orig>AvB)+min(pix\_vec,[\ ],3)*(orig<AvB)+pix\_vec(:,:,1)*(orig,AvB));$$

Edge Detail Considerations

As is discussed above, small window correction in one embodiment generates a correction value called CA_pix, which is a correction value that is especially appropriate for fine-detailed regions. Also as is discussed above, wide window edge correction in one embodiment generates a correction value called CA_pix_Ed that is especially appropriate for colored edges. In one embodiment, the two correction values, CA_pix and CA_pix_Ed, are averaged. According to one embodiment, the following steps are performed: (a) the quantity of edges in the region, Edg_weight, is calculated, (b) Edg_weight is combined with dg_weight, which is the quantity of colors with low signal-to-noise ratio in the region, and (c) output is averaged as a function of small window correction and wide window edge correction.

According to an embodiment of the invention, an Edge_Details value obtained from an infometric module indicates a quantity of edges in a region of an image. This value is compared to a threshold value stored in a variable called ED_thr. The computations discussed below also involve a variable called Caw_slopeE, which indicates slope power for edge-details treatment, and which in one embodiment equals 4. The computations discussed below also involve a variable called CAw_res, which in one embodiment equals 4. CAw_max is equal to 2^CAw_res (thus, in one embodiment, 16), and is the maximum value that Edg_weight is permitted to be. In one embodiment of the invention, the following computations are performed to calculate Edg_weight:

```
if Edge_Details<ED_thr
    Edg_weight = 0;
else
    Edg_weight = round((2^CAw_slopeE*(Edge_Details-ED_thr))/2^(Ed_res-CAw_res));
end
if Edg_weight > CAw_max;
    Edg_weight = CAw_max;
end
```

After Edg_weight has been calculated in the above manner, Edg_weight is combined with dgWB, which is discussed above in the context of white balance gain in the section pertaining to danger regulation. In the following equations, dg_res indicates the power of danger resolution, and in one embodiment equals 5. In one embodiment, the following computations are performed:

$$Edg\_weight2 = round(Edg\_weight * dgWB/2\,\hat{}\,dg\_res);$$

$$Edg\_weight2(Edg\_weight2 > CAw\_max) = CAw\_max;$$

In one embodiment of the invention, the correction value is then averaged as a function of small window correction and wide window edge correction, accomplished by the following computation:

$$CA\_pix = CA\_pix + round(Edg\_weight2*(CA\_pix\_Ed - CA\_pix)/CAw\_max);$$

Oversharpening Limiter

In one embodiment of the invention, an amount of allowed oversharpening is specified as max_deltaCA. Next, a clipped CA_pix version, CA_pix_S is created as follows: if CA_pix is higher than orig by more than max_deltaCA, then CA_pix is clipped to orig+max_delta_CA. If orig is higher than CA_pix by more than max_deltaCA, then clip CA_pix is clipped to orig-max_delta_CA. Otherwise CA_pix is unaltered. An example computation for creating CA_pix_S is: CA_pix_S= (orig+max_deltaCA)*((CA_pix−orig)>max_deltaCA)+ (orig-max_deltaCA)*((orig−CA_pix)>max_deltaCA)+ CA_pix*((CA_pix−orig)<=max_deltaCA)*((orig−CA_pix) <=max_deltaCA);

In one embodiment, CA_pix, which reflects the correction value for the selected correction mode, is then averaged based on CA_pix_S by the following computation:

$$CA\_pix = CA\_pix + round(Edg\_weight*(CA\_pix\_S - CA\_pix)/CAw\_max);$$

Restoration, Offset Compensation, and Clipping

In one embodiment, output from the limiter is used to restore the output image, thereby correcting the aberrations. The following computations are performed, in one embodiment, in order to achieve offset compensation:

In the case of a central red pixel, CA_pix=2*CA_pix−$r_{offset}$;

In the case of a central green pixel, CA_pix=2*CA_pix−$g_{offset}$;

In the case of a central blue pixel, CA_pix=2*CA_pix−$b_{offset}$;

In one embodiment, clipping may be performed according to the following computations:

$$CA\_pix = CA\_pix*(CA\_pix >= 0);$$

$$pix\_out = CA\_pix*(CA\_pix <= max\_pixel\_val) + max\_pixel\_val*(CA\_pix > max\_pixel\_val);$$

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
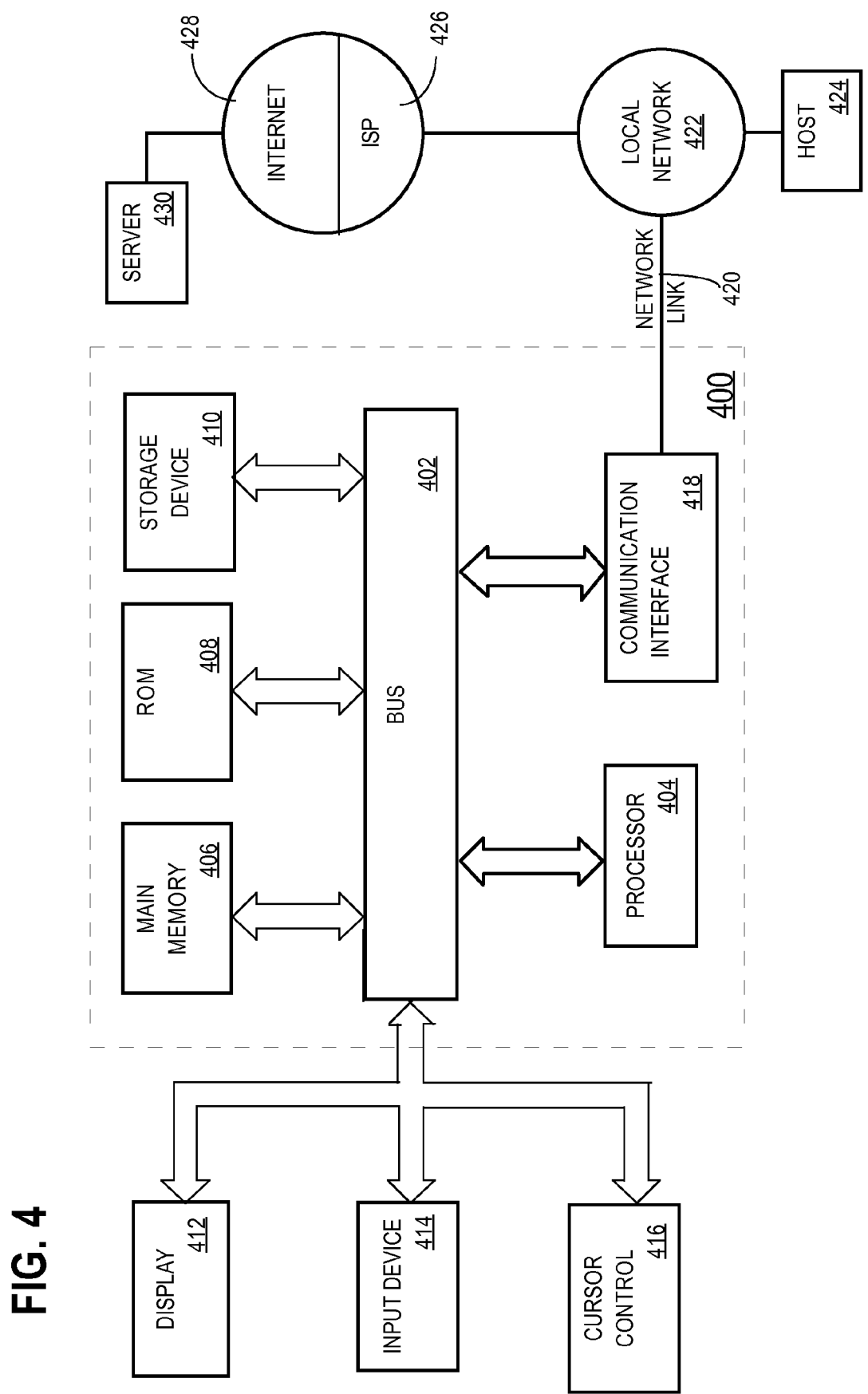
FIG. 4 is a block diagram that illustrates a computer system 400 upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An image processing method comprising:
    determining which of a plurality of color channels is a sharpest color channel in a portion of an image that contains an axial chromatic aberration, wherein each of the color channels in the plurality of color channels has an associated relative difference value, wherein the relative difference value associated with a color channel is derived based, at least in part, upon a difference between: (a) an average pixel value, for that color channel, of pixels neighboring a central pixel in a matrix of pixels; and (b) a pixel value, for that color channel, of the central pixel, and wherein the sharpest color channel is determined as the color channel having the maximal relative difference value associated therewith;
    using at least the relative difference value associated with the sharpest color channel to determine a correction value for the central pixel; and
    applying the correction value to the central pixel to correct for the axial chromatic aberration.

2. The method of claim 1, wherein the plurality of color channels comprises a first color channel, a second color channel, and a third color channel, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein the method further comprises the following operation, which is performed prior to determining which of the plurality of color channels is the sharpest color channel in the portion of the image:
    deriving an initial relative difference value (RD1) for the first color channel, an initial relative difference value (RD2) for the second color channel, and an initial relative difference value (RD3) for the third color channel, wherein deriving RD1, RD2, and RD3 comprises:
        determining an average pixel value (m1) for the first color channel based at least in part upon the pixel values of the neighboring pixels for the first color channel;
        determining a difference value (d1) for the first color channel, wherein d1 is the difference between m1 and the pixel value of the central pixel for the first color channel;
        determining an average pixel value (m2) for the second color channel based at least in part upon the pixel values of the neighboring pixels for the second color channel;
        determining a difference value (d2) for the second color channel, wherein d2 is the difference between m2 and the pixel value of the central pixel for the second color channel;

determining an average pixel value (m3) for the third color channel based at least in part upon the pixel values of the neighboring pixels for the third color channel;

determining a difference value (d3) for the third color channel, wherein d3 is the difference between m3 and the pixel value of the central pixel for the third color channel; and deriving RD1, where RD1 is proportional to d1/m1;
deriving RD2, where RD2 is proportional to d2/m2; and
deriving RD3, where RD3 is proportional to d3/m3.

3. The method of claim 1, wherein the plurality of color channels comprises a first color channel, a second color channel, and a third color channel, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein the method further comprises the following operation, which is performed prior to determining which of the plurality of color channels is the sharpest color channel in the portion of the image:

deriving an initial relative difference value (RD1) for the first color channel, an initial relative difference value (RD2) for the second color channel, and an initial relative difference value (RD3) for the third color channel, wherein deriving RD1, RD2, and RD3 comprises:

determining an average pixel value (m1) for the first color channel based at least in part upon the pixel values of the neighboring pixels for the first color channel;

determining a difference value (d1) for the first color channel, wherein d1 is the difference between m1 and the pixel value of the central pixel for the first color channel;

determining an average pixel value (m2) for the second color channel based at least in part upon the pixel values of the neighboring pixels for the second color channel;

determining a difference value (d2) for the second color channel, wherein d2 is the difference between m2 and the pixel value of the central pixel for the second color channel;

determining an average pixel value (m3) for the third color channel based at least in part upon the pixel values of the neighboring pixels for the third color channel;

determining a difference value (d3) for the third color channel, wherein d3 is the difference between m3 and the pixel value of the central pixel for the third color channel; and deriving RD1, where RD1 is proportional to d1;
deriving RD2, where RD2 is proportional to (m1/m2)*d2; and
deriving RD3, where RD3 is proportional to (m1/m3)*d3.

4. The method of claim 1, wherein the plurality of color channels comprises a first color channel, a second color channel, and a third color channel, and wherein the method further comprises the following operations, which are performed prior to determining which of the plurality of color channels is the sharpest color channel in the portion of the image:

deriving an initial relative difference value (RD1) for the first color channel, an initial relative difference value (RD2) for the second color channel, and an initial relative difference value (RD3) for the third color channel;

regulating the initial relative difference values to derive an adjusted relative difference value for at least one of the first, second, and third color channels; and determining an associated relative difference value for each of the first, second, and third color channels, wherein the relative difference value associated with a color channel is the adjusted relative difference value, if there is one, for that color channel, or the initial relative difference value for that color channel if there is no adjusted relative difference value for that color channel.

5. The method of claim 4, wherein regulating the initial relative difference values, comprises:

determining whether the absolute value of a difference between RD1 and RD2 is higher than a specified level;

if so, reducing RD2 towards RD1 to derive an adjusted relative difference value RD2' for the second color channel;

determining whether the absolute value of a difference between RD1 and RD3 is higher than the specified level; and if so, reducing RD3 towards RD1 to derive an adjusted relative difference value RD3' for the second color channel.

6. The method of claim 5, wherein, if the absolute value of the difference between RD1 and RD2 is higher than the specified level, RD2 is reduced towards RD1 in accordance with a limit function that varies as a function of a luminance (Y) of the central pixel.

7. The method of claim 4, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein regulating the initial relative difference values, comprises:

determining a maximal hue change in the matrix of pixels;

determining a maximum ratio among a first ratio (r1), a second ratio (r2), and a third ratio (r3), where r1=m1/m2, r2=m1/m3, and r3=m2/m3, where m1 is an average pixel value for the first color channel derived based at least in part upon the pixel values of the neighboring pixels for the first color channel, m2 is an average pixel value for the second color channel derived based at least in part upon the pixel values of the neighboring pixels for the second color channel, and m3 is an average pixel value for the third color channel derived based at least in part upon the pixel values of the neighboring pixels for the third color channel;

determining a danger value based at least in part upon the maximal hue change and the maximum ratio;

deriving a white balance danger value based at least in part upon the danger value;

deriving a local danger value for the second color channel based at least in part upon the danger value;

deriving a local danger value for the third color channel based at least in part upon the danger value;

deriving an adjusted relative difference value RD2' for the second color channel based at least in part upon RD1, RD2, the white balance danger value, and the local danger value for the second color channel; and deriving an adjusted relative difference value RD3' for the third color channel based at least in part upon RD1, RD3, the white balance danger value, and the local danger value for the third color channel.

8. The method of claim 7, wherein determining the maximum hue change in the matrix of pixels comprises:
- deriving a first chroma matrix having a first chroma value for each pixel in the matrix of pixels, wherein the first chroma value for a pixel comprises a ratio between that pixel's pixel value for the first color channel and that pixel's pixel value for the second color channel;
- deriving a second chroma matrix having a second chroma value for each pixel in the matrix of pixels, wherein the second chroma value for a pixel comprises a ratio between that pixel's pixel value for the first color channel and that pixel's pixel value for the third color channel;
- deriving a third chroma matrix having a third chroma value for each pixel in the matrix of pixels, wherein the third chroma value for a pixel comprises a ratio between that pixel's pixel value for the second color channel and that pixel's pixel value for the third color channel;
- applying gradients in a plurality of directions to each of the first chroma matrix, the second chroma matrix, and the third chroma matrix, to derive a plurality of gradient values; and
- determining, based at least in part upon the plurality of gradient values, the maximal hue change in the matrix of pixels.

9. The method of claim 8, wherein applying gradients comprises:
- applying a gradient in a first direction to the first chroma matrix to derive a first gradient value, and applying a gradient in a second direction to the first chroma matrix to derive a second gradient value;
- applying a gradient in the first direction to the second chroma matrix to derive a third gradient value, and applying a gradient in the second direction to the second chroma matrix to derive a fourth gradient value; and
- applying a gradient in the first direction to the third chroma matrix to derive a fifth gradient value, and applying a gradient in the second direction to the third chroma matrix to derive a sixth gradient value.

10. The method of claim 9, wherein determining the maximal hue change comprises:
- deriving a first hue change based at least in part upon the first and second gradient values;
- deriving a second hue change based at least in part upon the third and fourth gradient values;
- deriving a third hue change based at least in part upon the fifth and sixth gradient values; and
- selecting a maximum hue change among the first hue change, the second hue change, and the third hue change.

11. The method of claim 4, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein regulating the initial relative difference values, comprises:
- deriving a white balance danger value based at least in part upon a first ratio (r1) and a second ratio (r2), where r1=m1/m2 and r2=m1/m3, where m1 is an average pixel value for the first color channel derived based at least in part upon the pixel values of the neighboring pixels for the first color channel, m2 is an average pixel value for the second color channel derived based at least in part upon the pixel values of the neighboring pixels for the second color channel, and m3 is an average pixel value for the third color channel derived based at least in part upon the pixel values of the neighboring pixels for the third color channel;
- deriving a local danger value for the second color channel based at least in part upon the first ratio;
- deriving a local danger value for the third color channel based at least in part upon the second ratio;
- deriving an adjusted relative difference value RD2' for the second color channel based at least in part upon RD1, RD2, the white balance danger value, and the local danger value for the second color channel; and
- deriving an adjusted relative difference value RD3' for the third color channel based at least in part upon RD1, RD3, the white balance danger value, and the local danger value for the third color channel.

12. The method of claim 1, wherein the plurality of color channels comprises a first color channel, a second color channel, and a third color channel, one of which is the sharpest color channel, wherein the central pixel has a pixel value (Orig) for the first color channel, wherein the pixels neighboring the central pixel in the matrix of pixels have a pixel value for the first color channel, wherein the first color channel has a current color average (mc) that is derived based at least in part upon the pixel values of the neighboring pixels for the first color channel, and wherein using at least the relative difference value associated with the sharpest color channel to determine a correction value for the central pixel comprises:
- deriving a set of differences, including a first difference, a second difference, and a third difference, wherein the first difference comprises a difference between mc and a relative difference value associated with the first color channel, the second difference comprises a difference between mc and a relative difference associated with the second color channel, and the third difference comprises a difference between mc and a relative difference value associated with the third color channel;
- determining whether Orig is greater than, less than, or equal to mc;
- if Orig is greater than mc, deriving the correction value based at least in part upon the maximum among the first difference, the second difference, and the third difference;
- if Orig is less than mc, deriving the correction value based at least in part upon the minimum among the first difference, the second difference, and the third difference; and
- if Orig is equal to mc, deriving the correction value based at least in part upon the first difference.

13. The method of claim 1, wherein the plurality of color channels comprises a first color channel, wherein the pixels neighboring the central pixel in the matrix of pixels have a pixel value for the first color channel, wherein the first color channel has a current color average (mc) that is derived based at least in part upon the pixel values of the neighboring pixels for the first color channel, and wherein using at least the relative difference value associated with the sharpest color channel to determine a correction value for the central pixel comprises:
- deriving the correction value based at least in part upon a difference between mc and the relative difference value associated with the sharpest color channel.

14. The method of claim 1, wherein using at least the relative difference value associated with the sharpest color channel to determine a correction value for the central pixel comprises:
- determining whether a low-light condition exists for the image; and if so, adjusting the correction value for the central pixel to take the low-light condition into account.

15. The method of claim 1, wherein the plurality of color channels comprises a first color channel, a second color channel, and a third color channel, one of which is the sharpest color channel, wherein the central pixel has a pixel value (Orig) for the first color channel, wherein the pixels neighboring the central pixel in the matrix of pixels have a pixel value for the first color channel, wherein additional pixels neighboring the central pixel beyond the matrix of pixels have a pixel value for the first color channel, wherein the first color channel has a current color average (mc) that is derived based at least in part upon the pixel values of the neighboring pixels for the first color channel, wherein the first color channel has a wide window average that is derived based at least in part upon a weighted average of the pixel values of the neighboring pixels and the additional neighboring pixels for the first color channel, and wherein using at least the relative difference value associated with the sharpest color channel to determine a correction value for the central pixel comprises:

deriving a set of differences, including a first difference, a second difference, and a third difference, wherein the first difference comprises a difference between mc and a relative difference value associated with the first color channel, the second difference comprises a difference between mc and a relative difference associated with the second color channel, and the third difference comprises a difference between mc and a relative difference value associated with the third color channel;

determining whether Orig is greater than, less than, or equal to the wide window average;

if Orig is greater than the wide window average, deriving the correction value based at least in part upon the maximum among the first difference, the second difference, and the third difference;

if Orig is less than the wide window average, deriving the correction value based at least in part upon the minimum among the first difference, the second difference, and the third difference; and if Orig is equal to the wide window average, deriving the correction value based at least in part upon the first difference.

16. The method of claim 1, wherein using at least the relative difference value associated with the sharpest color channel to determine a correction value for the central pixel comprises:

performing small window correction relative to the matrix of pixels to produce a first correction value;

performing wide window edge correction relative to the matrix of pixels to produce a second correction value; and performing an averaging operation based at least in part upon the first correction value and the second correction value to derive a correction value for the central pixel.

17. The method of claim 1, wherein the plurality of color channels comprises a first color channel, wherein the central pixel has a pixel value (Orig) for the first color channel, and wherein using at least the relative difference value associated with the sharpest color channel to determine a correction value for the central pixel comprises:

determining whether the correction value is higher than Orig by more than a maximum delta;

if so, clipping the correction value to Orig plus the maximum delta;

determining whether Orig is higher than the correction value by more than the maximum delta; and if so, clipping the correction value to Orig minus the maximum delta.

18. A special-purpose computing device configured to perform the following operations:

determining which of a plurality of color channels is a sharpest color channel in a portion of an image that contains an axial chromatic aberration, wherein each of the color channels in the plurality of color channels has an associated relative difference value, wherein the relative difference value associated with a color channel is derived based, at least in part, upon a difference between: (a) an average pixel value, for that color channel, of pixels neighboring a central pixel in a matrix of pixels; and (b) a pixel value, for that color channel, of the central pixel, and wherein the sharpest color channel is determined as the color channel having the maximal relative difference value associated therewith;

using at least the relative difference value associated with the sharpest color channel to determine a correction value for the central pixel; and applying the correction value to the central pixel to correct for the axial chromatic aberration.

19. The special-purpose computing device of claim 18, wherein the plurality of color channels comprises a first color channel, a second color channel, and a third color channel, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein the special-purpose computing device is configured to further perform the following operation, which is performed prior to determining which of the plurality of color channels is the sharpest color channel in the portion of the image:

deriving an initial relative difference value (RD1) for the first color channel, an initial relative difference value (RD2) for the second color channel, and an initial relative difference value (RD3) for the third color channel, wherein deriving RD1, RD2, and RD3 comprises:

determining an average pixel value (m1) for the first color channel based at least in part upon the pixel values of the neighboring pixels for the first color channel;

determining a difference value (d1) for the first color channel, wherein d1 is the difference between m1 and the pixel value of the central pixel for the first color channel;

determining an average pixel value (m2) for the second color channel based at least in part upon the pixel values of the neighboring pixels for the second color channel;

determining a difference value (d2) for the second color channel, wherein d2 is the difference between m2 and the pixel value of the central pixel for the second color channel;

determining an average pixel value (m3) for the third color channel based at least in part upon the pixel values of the neighboring pixels for the third color channel;

determining a difference value (d3) for the third color channel, wherein d3 is the difference between m3 and the pixel value of the central pixel for the third color channel; and deriving RD1, where RD1 is proportional to d1/m1;

deriving RD2, where RD2 is proportional to d2/m2; and deriving RD3, where RD3 is proportional to d3/m3.

20. The special-purpose computing device of claim 18, wherein the plurality of color channels comprises a first color channel, a second color channel, and a third color channel, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein the special-purpose computing device is configured to further perform the following operation, which is performed prior to determining which of the plurality of color channels is the sharpest color channel in the portion of the image:
  deriving an initial relative difference value (RD1) for the first color channel, an initial relative difference value (RD2) for the second color channel, and an initial relative difference value (RD3) for the third color channel, wherein deriving RD1, RD2, and RD3 comprises:
    determining an average pixel value (m1) for the first color channel based at least in part upon the pixel values of the neighboring pixels for the first color channel;
    determining a difference value (d1) for the first color channel, wherein d1 is the difference between m1 and the pixel value of the central pixel for the first color channel;
    determining an average pixel value (m2) for the second color channel based at least in part upon the pixel values of the neighboring pixels for the second color channel;
    determining a difference value (d2) for the second color channel, wherein d2 is the difference between m2 and the pixel value of the central pixel for the second color channel;
    determining an average pixel value (m3) for the third color channel based at least in part upon the pixel values of the neighboring pixels for the third color channel;
    determining a difference value (d3) for the third color channel, wherein d3 is the difference between m3 and the pixel value of the central pixel for the third color channel; and
    deriving RD1, where RD1 is proportional to d1;
    deriving RD2, where RD2 is proportional to (m1/m2)*d2; and
    deriving RD3, where RD3 is proportional to (m1/m3)*d3.

21. The special-purpose computing device of claim 18, wherein the plurality of color channels comprises a first color channel, a second color channel, and a third color channel, and wherein the special-purpose computing device is configured to further perform the following operations, which are performed prior to determining which of the plurality of color channels is the sharpest color channel in the portion of the image:
  deriving an initial relative difference value (RD1) for the first color channel, an initial relative difference value (RD2) for the second color channel, and an initial relative difference value (RD3) for the third color channel;
  regulating the initial relative difference values to derive an adjusted relative difference value for at least one of the first, second, and third color channels; and
  determining an associated relative difference value for each of the first, second, and third color channels, wherein the relative difference value associated with a color channel is the adjusted relative difference value, if there is one, for that color channel, or the initial relative difference value for that color channel if there is no adjusted relative difference value for that color channel.

22. The special-purpose computing device of claim 21, wherein regulating the initial relative difference values, comprises:
  determining whether the absolute value of a difference between RD1 and RD2 is higher than a specified level;
  if so, reducing RD2 towards RD1 to derive an adjusted relative difference value RD2' for the second color channel;
  determining whether the absolute value of a difference between RD1 and RD3 is higher than the specified level; and
  if so, reducing RD3 towards RD1 to derive an adjusted relative difference value RD3' for the second color channel.

23. The special-purpose computing device of claim 22, wherein, if the absolute value of the difference between RD1 and RD2 is higher than the specified level, RD2 is reduced towards RD1 in accordance with a limit function that varies as a function of a luminance (Y) of the central pixel.

24. The special-purpose computing device of claim 21, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein regulating the initial relative difference values, comprises:
  deriving a white balance danger value based at least in part upon a first ratio (r1) and a second ratio (r2), where r1=m1/m2 and r2=m1/m3, where m1 is an average pixel value for the first color channel derived based at least in part upon the pixel values of the neighboring pixels for the first color channel, m2 is an average pixel value for the second color channel derived based at least in part upon the pixel values of the neighboring pixels for the second color channel, and m3 is an average pixel value for the third color channel derived based at least in part upon the pixel values of the neighboring pixels for the third color channel;
  deriving a local danger value for the second color channel based at least in part upon the first ratio;
  deriving a local danger value for the third color channel based at least in part upon the second ratio;
  deriving an adjusted relative difference value RD2' for the second color channel based at least in part upon RD1, RD2, the white balance danger value, and the local danger value for the second color channel; and
  deriving an adjusted relative difference value RD3' for the third color channel based at least in part upon RD1, RD3, the white balance danger value, and the local danger value for the third color channel.

25. The special-purpose computing device of claim 21, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein regulating the initial relative difference values, comprises:

determining a maximal hue change in the matrix of pixels;
determining a maximum ratio among a first ratio (r1), a second ratio (r2), and a third ratio (r3), where r1=m1/m2, r2=m1/m3, and r3=m2/m3, where m1 is an average pixel value for the first color channel derived based at least in part upon the pixel values of the neighboring pixels for the first color channel, m2 is an average pixel value for the second color channel derived based at least in part upon the pixel values of the neighboring pixels for the second color channel, and m3 is an average pixel value for the third color channel derived based at least in part upon the pixel values of the neighboring pixels for the third color channel;
determining a danger value based at least in part upon the maximal hue change and the maximum ratio;
deriving a white balance danger value based at least in part upon the danger value;
deriving a local danger value for the second color channel based at least in part upon the danger value;
deriving a local danger value for the third color channel based at least in part upon the danger value;
deriving an adjusted relative difference value RD2' for the second color channel based at least in part upon RD1, RD2, the white balance danger value, and the local danger value for the second color channel; and
deriving an adjusted relative difference value RD3' for the third color channel based at least in part upon RD1, RD3, the white balance danger value, and the local danger value for the third color channel.

26. The special-purpose computing device of claim 25, wherein determining the maximum hue change in the matrix of pixels comprises:
deriving a first chroma matrix having a first chroma value for each pixel in the matrix of pixels, wherein the first chroma value for a pixel comprises a ratio between that pixel's pixel value for the first color channel and that pixel's pixel value for the second color channel;
deriving a second chroma matrix having a second chroma value for each pixel in the matrix of pixels, wherein the second chroma value for a pixel comprises a ratio between that pixel's pixel value for the first color channel and that pixel's pixel value for the third color channel;
deriving a third chroma matrix having a third chroma value for each pixel in the matrix of pixels, wherein the third chroma value for a pixel comprises a ratio between that pixel's pixel value for the second color channel and that pixel's pixel value for the third color channel;
applying gradients in a plurality of directions to each of the first chroma matrix, the second chroma matrix, and the third chroma matrix, to derive a plurality of gradient values; and
determining, based at least in part upon the plurality of gradient values, the maximal hue change in the matrix of pixels.

27. The special-purpose computing device of claim 26, wherein applying gradients comprises:
applying a gradient in a first direction to the first chroma matrix to derive a first gradient value, and applying a gradient in a second direction to the first chroma matrix to derive a second gradient value;
applying a gradient in the first direction to the second chroma matrix to derive a third gradient value, and applying a gradient in the second direction to the second chroma matrix to derive a fourth gradient value; and
applying a gradient in the first direction to the third chroma matrix to derive a fifth gradient value, and applying a gradient in the second direction to the third chroma matrix to derive a sixth gradient value.

28. The special-purpose computing device of claim 27, wherein determining the maximal hue change comprises:
deriving a first hue change based at least in part upon the first and second gradient values;
deriving a second hue change based at least in part upon the third and fourth gradient values;
deriving a third hue change based at least in part upon the fifth and sixth gradient values; and
selecting a maximum hue change among the first hue change, the second hue change, and the third hue change.

29. The special-purpose computing device of claim 18, wherein the plurality of color channels comprises a first color channel, a second color channel, and a third color channel, one of which is the sharpest color channel, wherein the central pixel has a pixel value (Orig) for the first color channel, wherein the pixels neighboring the central pixel in the matrix of pixels have a pixel value for the first color channel, wherein the first color channel has a current color average (mc) that is derived based at least in part upon the pixel values of the neighboring pixels for the first color channel, and wherein using at least the relative difference value associated with the sharpest color channel to determine a correction value for the central pixel comprises:
deriving a set of differences, including a first difference, a second difference, and a third difference, wherein the first difference comprises a difference between mc and a relative difference value associated with the first color channel, the second difference comprises a difference between mc and a relative difference associated with the second color channel, and the third difference comprises a difference between mc and a relative difference value associated with the third color channel;
determining whether Orig is greater than, less than, or equal to mc;
if Orig is greater than mc, deriving the correction value based at least in part upon the maximum among the first difference, the second difference, and the third difference;
if Orig is less than mc, deriving the correction value based at least in part upon the minimum among the first difference, the second difference, and the third difference; and
if Orig is equal to mc, deriving the correction value based at least in part upon the first difference.

30. The special-purpose computing device of claim 18, wherein the plurality of color channels comprises a first color channel, wherein the pixels neighboring the central pixel in the matrix of pixels have a pixel value for the first color channel, wherein the first color channel has a current color average (mc) that is derived based at least in part upon the pixel values of the neighboring pixels for the first color channel, and wherein using at least the relative difference value associated with the sharpest color channel to determine a correction value for the central pixel comprises:
deriving the correction value based at least in part upon a difference between mc and the relative difference value associated with the sharpest color channel.

31. The special-purpose computing device of claim 18, wherein using at least the relative difference value associated with the sharpest color channel to determine a correction value for the central pixel comprises:
determining whether a low-light condition exists for the image; and
if so, adjusting the correction value for the central pixel to take the low-light condition into account.

32. The special-purpose computing device of claim 18, wherein the plurality of color channels comprises a first color channel, a second color channel, and a third color channel, one of which is the sharpest color channel, wherein the central pixel has a pixel value (Orig) for the first color channel, wherein the pixels neighboring the central pixel in the matrix of pixels have a pixel value for the first color channel, wherein additional pixels neighboring the central pixel beyond the matrix of pixels have a pixel value for the first color channel, wherein the first color channel has a current color average (mc) that is derived based at least in part upon the pixel values of the neighboring pixels for the first color channel, wherein the first color channel has a wide window average that is derived based at least in part upon a weighted average of the pixel values of the neighboring pixels and the additional neighboring pixels for the first color channel, and wherein using at least the relative difference value associated with the sharpest color channel to determine a correction value for the central pixel comprises:

deriving a set of differences, including a first difference, a second difference, and a third difference, wherein the first difference comprises a difference between mc and a relative difference value associated with the first color channel, the second difference comprises a difference between mc and a relative difference associated with the second color channel, and the third difference comprises a difference between mc and a relative difference value associated with the third color channel;

determining whether Orig is greater than, less than, or equal to the wide window average;

if Orig is greater than the wide window average, deriving the correction value based at least in part upon the maximum among the first difference, the second difference, and the third difference;

if Orig is less than the wide window average, deriving the correction value based at least in part upon the minimum among the first difference, the second difference, and the third difference; and if Orig is equal to the wide window average, deriving the correction value based at least in part upon the first difference.

33. The special-purpose computing device of claim 18, wherein using at least the relative difference value associated with the sharpest color channel to determine a correction value for the central pixel comprises:

performing small window correction relative to the matrix of pixels to produce a first correction value;

performing wide window edge correction relative to the matrix of pixels to produce a second correction value; and performing an averaging operation based at least in part upon the first correction value and the second correction value to derive a correction value for the central pixel.

34. The special-purpose computing device of claim 18, wherein the plurality of color channels comprises a first color channel, wherein the central pixel has a pixel value (Orig) for the first color channel, and wherein using at least the relative difference value associated with the sharpest color channel to determine a correction value for the central pixel comprises:

determining whether the correction value is higher than Orig by more than a maximum delta;

if so, clipping the correction value to Orig plus the maximum delta;

determining whether Orig is higher than the correction value by more than the maximum delta; and if so, clipping the correction value to Orig minus the maximum delta.

35. A non-transitory storage medium storing instructions which, when executed by one or more processors, cause the one or more processors to perform the operations of:

determining which of a plurality of color channels is a sharpest color channel in a portion of an image that contains an axial chromatic aberration, wherein each of the color channels in the plurality of color channels has an associated relative difference value, wherein the relative difference value associated with a color channel is derived based, at least in part, upon a difference between: (a) an average pixel value, for that color channel, of pixels neighboring a central pixel in a matrix of pixels; and (b) a pixel value, for that color channel, of the central pixel, and wherein the sharpest color channel is determined as the color channel having the maximal relative difference value associated therewith;

using at least the relative difference value associated with the sharpest color channel to determine a correction value for the central pixel; and applying the correction value to the central pixel to correct for the axial chromatic aberration.

36. The non-transitory storage medium of claim 35, wherein the plurality of color channels comprises a first color channel, a second color channel, and a third color channel, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein the instructions cause the one or more processors to further perform the following operation, which is performed prior to determining which of the plurality of color channels is the sharpest color channel in the portion of the image:

deriving an initial relative difference value (RD1) for the first color channel, an initial relative difference value (RD2) for the second color channel, and an initial relative difference value (RD3) for the third color channel, wherein deriving RD1, RD2, and RD3 comprises:

determining an average pixel value (m1) for the first color channel based at least in part upon the pixel values of the neighboring pixels for the first color channel;

determining a difference value (d1) for the first color channel, wherein d1 is the difference between m1 and the pixel value of the central pixel for the first color channel;

determining an average pixel value (m2) for the second color channel based at least in part upon the pixel values of the neighboring pixels for the second color channel;

determining a difference value (d2) for the second color channel, wherein d2 is the difference between m2 and the pixel value of the central pixel for the second color channel;

determining an average pixel value (m3) for the third color channel based at least in part upon the pixel values of the neighboring pixels for the third color channel;

determining a difference value (d3) for the third color channel, wherein d3 is the difference between m3 and the pixel value of the central pixel for the third color channel; and deriving RD1, where RD1 is proportional to d1/m1;
deriving RD2, where RD2 is proportional to d2/m2; and
deriving RD3, where RD3 is proportional to d3/m3.

37. The non-transitory storage medium of claim 35, wherein the plurality of color channels comprises a first color channel, a second color channel, and a third color channel, wherein the central pixel has a pixel value for the first color channel, a pixel value for the second color channel, and a pixel value for the third color channel, wherein the pixels neighboring the central pixel in the matrix of pixel have a pixel value for the first color channel, a pixel value for the second color channel, and a pixel value for the third color channel, and wherein the instructions cause the one or more processors to further perform the following operation, which is performed prior to determining which of the plurality of color channels is the sharpest color channel in the portion of the image:
- deriving an initial relative difference value (RD1) for the first color channel, an initial relative difference value (RD2) for the second color channel, and an initial relative difference value (RD3) for the third color channel, wherein deriving RD1, RD2, and RD3 comprises:
- determining an average pixel value (m1) for the first color channel based at least in part upon the pixel values of the neighboring pixels for the first color channel;
- determining a difference value (d1) for the first color channel, wherein d1 is the difference between m1 and the pixel value of the central pixel for the first color channel;
- determining an average pixel value (m2) for the second color channel based at least in part upon the pixel values of the neighboring pixels for the second color channel;
- determining a difference value (d2) for the second color channel, wherein d2 is the difference between m2 and the pixel value of the central pixel for the second color channel;
- determining an average pixel value (m3) for the third color channel based at least in part upon the pixel values of the neighboring pixels for the third color channel;
- determining a difference value (d3) for the third color channel, wherein d3 is the difference between m3 and the pixel value of the central pixel for the third color channel; and
- deriving RD1, where RD1 is proportional to d1;
- deriving RD2, where RD2 is proportional to (m1/m2)*d2; and
- deriving RD3, where RD3 is proportional to (m1/m3)*d3.

38. The non-transitory storage medium of claim 35, wherein the plurality of color channels comprises a first color channel, a second color channel, and a third color channel, and wherein the instructions cause the one or more processors to further perform the following operations, which are performed prior to determining which of the plurality of color channels is the sharpest color channel in the portion of the image:
- deriving an initial relative difference value (RD1) for the first color channel, an initial relative difference value (RD2) for the second color channel, and an initial relative difference value (RD3) for the third color channel;
- regulating the initial relative difference values to derive an adjusted relative difference value for at least one of the first, second, and third color channels; and
- determining an associated relative difference value for each of the first, second, and third color channels, wherein the relative difference value associated with a color channel is the adjusted relative difference value, if there is one, for that color channel, or the initial relative difference value for that color channel if there is no adjusted relative difference value for that color channel.

* * * * *